(12) United States Patent
Inoue et al.

(10) Patent No.: US 9,026,295 B2
(45) Date of Patent: May 5, 2015

(54) CONTROL APPARATUS FOR HYBRID VEHICLE

(71) Applicant: Toyota Jidosha Kabushiki Kaisha, Toyota-shi, Aichi (JP)

(72) Inventors: Yuji Inoue, Nisshin (JP); Yukihiko Ideshio, Nisshin (JP); Yousuke Michikoshi, Miyoshi (JP)

(73) Assignee: Toyota Jidosha Kabushiki Kaisha (JP)

( * ) Notice: Subject to any disclaimer, the term of this patent is extended or adjusted under 35 U.S.C. 154(b) by 49 days.

(21) Appl. No.: 14/070,051

(22) Filed: Nov. 1, 2013

(65) Prior Publication Data

US 2014/0129066 A1 May 8, 2014

Related U.S. Application Data

(60) Provisional application No. 61/721,120, filed on Nov. 1, 2012.

(51) Int. Cl.
*B60W 20/00* (2006.01)

(52) U.S. Cl.
CPC ............ *B60W 20/40* (2013.01); *Y10S 903/946* (2013.01); *Y02T 10/6221* (2013.01); *Y02T 10/6286* (2013.01)

(58) Field of Classification Search
None
See application file for complete search history.

(56) References Cited

U.S. PATENT DOCUMENTS

| | | | | |
|---|---|---|---|---|
| 8,483,920 | B2 * | 7/2013 | Watanabe | 701/68 |
| 2004/0009842 | A1 * | 1/2004 | Inada | 477/5 |
| 2007/0272456 | A1 | 11/2007 | Shiiba | |
| 2007/0272965 | A1 | 11/2007 | Hintz et al. | |
| 2009/0118086 | A1 * | 5/2009 | Heap et al. | 477/5 |
| 2009/0143189 | A1 * | 6/2009 | Hasegawa et al. | 477/5 |
| 2012/0173103 | A1 * | 7/2012 | Barbir et al. | 701/67 |
| 2012/0290248 | A1 * | 11/2012 | Hebbale et al. | 702/130 |

FOREIGN PATENT DOCUMENTS

| | | |
|---|---|---|
| JP | 2008007094 A | 1/2008 |
| JP | 2010083426 A | 4/2010 |

OTHER PUBLICATIONS

Machine Translation of Japanese Publication No. 2010-083426 A; Published Apr. 15, 2010.

* cited by examiner

*Primary Examiner* — John R Olszewski
*Assistant Examiner* — David Merlino
(74) *Attorney, Agent, or Firm* — Dinsmore & Shohl LLP

(57) ABSTRACT

A control apparatus for a hybrid vehicle which is provided with an engine and an electric motor each functioning as a drive power source, and a clutch selectively connecting the engine and the electric motor to each other, said control apparatus being configured to switch a drive mode of the hybrid vehicle between an engine-driven running with at least said engine of the drive power source consisting of the engine and said electric motor used as the drive power source and with said clutch placed in a fully engaged state, and an electric-motor-driven running with said electric motor used as the drive power source and with said clutch placed in a released state, includes: a clutch temperature calculating portion configured to calculate, during said engine-driven running, an estimated temperature of said clutch upon a next engaging action of the clutch for switching of said drive mode from the following electric-motor-driven running back to the engine-driven running; and a switching control portion configured to continue the engine-driven running while inhibiting a releasing action of said clutch if said estimated temperature of the clutch calculated by said clutch temperature calculating portion is not lower than a predetermined overheat threshold value.

2 Claims, 3 Drawing Sheets

CONTROL APPARATUS FOR HYBRID VEHICLE

CROSS REFERENCE TO RELATED APPLICATIONS

The present specification claims priority to U.S. Provisional Patent Application Ser. No. 61/721,120 filed Nov. 1, 2012 and entitled "CONTROL APPARATUS FOR HYBRID VEHICLE," the entirety of which is incorporated by reference herein.

TECHNICAL FIELD

The present specification relates to a technique for improving the durability of a clutch provided in a hybrid vehicle in which the clutch is disposed between an engine and an electric motor.

BACKGROUND

There is known a hybrid vehicle provided with an engine, an electric motor, and a clutch operable to selectively connect the engine to a power transmitting path from the electric motor to the vehicle drive wheels. Patent Documents 1 and 2 disclose examples of such a hybrid vehicle. During operation of the hybrid vehicle disclosed in Patent Documents 1 or 2, the clutch is placed in a slipping state as a drive mode of the hybrid vehicle is switched between an electric motor drive mode in which the hybrid vehicle is driven with the electric motor used as a drive power source, and an engine drive mode in which the hybrid vehicle is driven with the engine or the engine and the electric motor used as the drive power source. In the slipping state, the temperature of the clutch increases. In view of this increase in temperature, the clutch is controlled to be brought into an engaged state or a released state when the temperature of the clutch reaches a value close to its overheat upper limit. Thus, the condition under which the clutch is permitted to be placed in its slipping state is restricted to reduce an increase in the temperature of the clutch.

PRIOR ART DOCUMENTS

Patent Document 1: JP-2008-007094 A
Patent Document 2: JP-2010-083426 A

SUMMARY

The hybrid vehicle is generally configured to bring the clutch into its released state for thereby switching its drive mode from an engine drive mode to an electric motor drive mode upon reduction of an operator's required vehicle drive force detected on the basis of an operating amount of a vehicle accelerating member, while a battery is sufficiently charged. When the operator's required vehicle drive force increased in the electric motor drive mode cannot be satisfactorily obtained with only the electric motor, it is determined whether to restore the clutch back to its engaged state and establish the engine drive mode to utilize an output of the engine to obtain the increase in vehicle drive force required by the operator. However, switching the clutch from its released state to its engaged state when the temperature of the clutch is close to the overheat upper limit causes generation of heat due to friction in the slipping state of the clutch, and may result in deterioration of the durability of the clutch. Further, the conventional control to restrict the condition for permitting the clutch to be placed in the slipping state inhibits switching to the engine drive mode when the clutch temperature is around an overheat upper limit. If the amount of electric energy stored in the battery in this state is reduced, it is difficult to run the vehicle with a high degree of drivability.

The systems and apparatuses described herein were made in view of the background described above and provide a control apparatus for a hybrid vehicle provided with a clutch operable to selectively connect an engine and an electric motor, which control apparatus prevents the deterioration of the durability of the clutch due to high temperatures and assures a high degree of drivability of the hybrid vehicle.

In one embodiment a control apparatus (a) for a hybrid vehicle which is provided with an engine and an electric motor each functioning as a drive power source, and a clutch selectively connecting the engine and the electric motor to each other, and which is configured to select one of an engine-driven running with at least the engine of the drive power source consisting of the engine and the electric motor used as the drive power source and with the clutch placed in a fully engaged state, and an electric-motor-driven running with the electric motor used as the drive power source and with the clutch placed in a released state, (b) characterized by calculating, during engine-driven running, an estimated temperature of the clutch upon a next engaging action of the clutch for switching from the following electric-motor-driven running back to engine-driven running, and continuing engine-driven running while inhibiting a releasing action of the clutch if the estimated temperature of the clutch is not lower than a predetermined overheat threshold value.

The hybrid vehicle control apparatuses described herein are configured such that engine-driven running is continued by inhibiting the releasing action of the clutch for switching from the present engine-driven running to electric-motor-driven running, if the estimated temperature of the clutch is not lower than the overheat threshold value. Accordingly, it is possible to maintain a high degree of drivability of the vehicle, by preventing overheating of the clutch upon switching from electric-motor-driven running to engine-driven running and thereby reducing deterioration of the durability of the clutch due to the overheating.

In embodiments, (c) the clutch is a wet-type multiple-disc friction clutch having friction plates lubricated by a lubricant, and (d) the estimated temperature of the clutch is calculated on the basis of a slipping speed of the clutch, an engaging torque (cranking torque) of the clutch, and a temperature of the lubricant for lubricating the clutch. In this case, it is not necessary to use an exclusive temperature sensor for detecting the estimated temperature of a component of the clutch, so that the required number of parts of the control apparatus can be reduced.

In some other embodiments, a torque converter provided with a direct connecting clutch, and an automatic transmission are provided in series with each other, in a power transmitting path from the clutch to the drive wheels.

DETAILED DESCRIPTION

An exemplary embodiment of the control apparatus will now be described in detail by reference to the drawings.

However, it should be understood that other embodiments of the control apparatus are contemplated.

Figure 1:
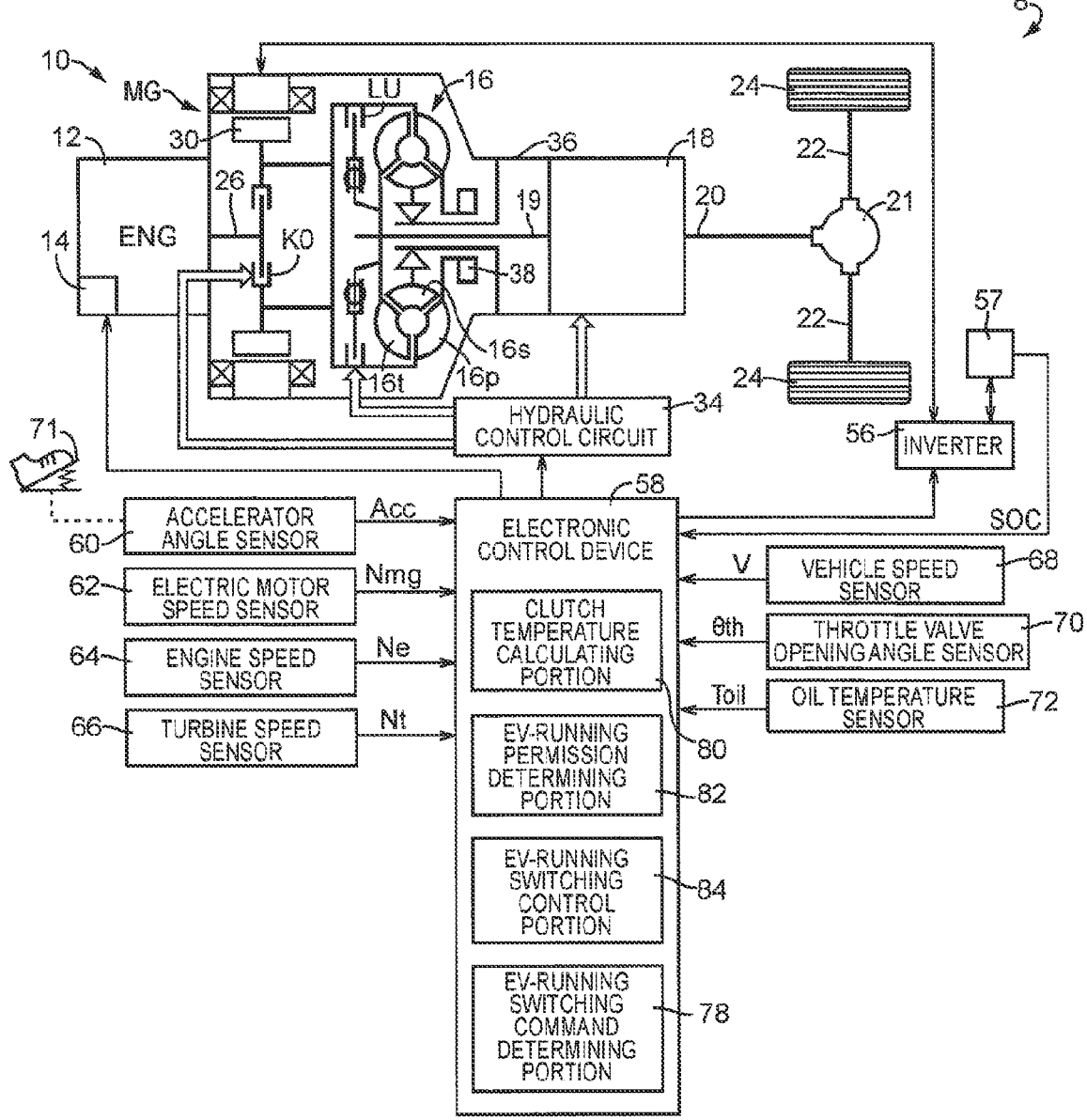
FIG. 1 is a block diagram depicting an arrangement of a drive system of a hybrid vehicle and major functions of an electronic control device according to one embodiment.

FIG. 1 schematically depicts the arrangement of the drive system of a hybrid vehicle 8 according to one embodiment. This hybrid vehicle 8 is provided with: a drive system 10; a differential gear device 21; a pair of right and left drive wheels 24 connected to the differential gear device 21 through a pair of right and left axles 22; a hydraulic control circuit 34; an inverter 56; and an electronic control device 58. The drive system 10 is provided with: an engine 12 constituted by an internal combustion engine functioning as a drive power source of the vehicle; an engine output control device 14 configured to implement engine output controls such as a control to start and stop the engine 12, a fuel injection control and a throttle control; an electric motor MG constituted by a motor generator and functioning as the drive power source of the vehicle and an electric generator; a clutch KO disposed between the engine 12 and the electric motor MG and operable to connect and disconnect the engine 12 and the electric motor MG to and from each other; a torque converter 16 provided with a lock-up clutch LU and disposed in a power transmitting path from the clutch KO to the drive wheels 24; and an automatic transmission 18 disposed in the power transmitting path.

In the vehicle 8 constructed as described above, a drive force generated by one or both of the engine 12 and the electric motor MG which function as the drive power source(s) is transmitted to the pair of right and left drive wheels 24 through the torque converter 16, automatic transmission 18, differential gear device 21 and a pair of right and left axles 22. Thus, the vehicle 8 has a motor drive (EV drive) mode and an engine drive (HEV drive) mode which are selectively established. In the motor drive mode, only the electric motor MG is used as the drive power source. In the engine drive mode, at least the engine 12 of the drive power source consisting of the engine 12 and the electric motor MG is used as the drive power source. In the following description of the present embodiment, operation of the vehicle in the motor drive mode will be referred to as "an electric-motor-driven running" while operation of the vehicle in the engine drive mode will be referred to as "an engine-driven running". In engine-driven running, an assisting torque generated by the electric motor MG may be added to an output torque of the engine 12, depending upon the specific operating condition of the vehicle.

For example, the electric motor MG is a 3-phase synchronous electric motor, which is a motor generator that functions both as a motor (electric motor) operable to generate a drive force, and a generator (electric generator) operable to generate a reaction force. The electric motor MG is electrically connected to an electric energy storage device 57 through the inverter 56 such that electric power can be supplied from or received by one of the electric motor MG and the electric energy storage device 57 to or from the other. For instance, the electric energy storage device 57 may be a secondary battery such as a lead battery, a nickel-hydrogen battery and a lithium-ion battery, or a capacitor.

In a power transmitting path between the engine 12 and the electric motor MG, there is disposed the clutch K0 for connecting to/disconnecting from the engine. In embodiments, the clutch K0 may be constituted by a well known hydraulically operated wet-type multiple-disc frictional coupling device, which is provided with a plurality of input-side friction plates rotated with an engine output shaft 26, a plurality of output-side friction plates each interposed between the adjacent input-side friction plates and rotated with a rotor 30, and a clutch piston, for example. This clutch K0 is operated by a pressurized oil supplied from the hydraulic control circuit 34, and functions as a power connecting and disconnecting device for selectively connecting the engine 12 to the power transmitting path from the electric motor MG to the drive wheels 24. When the clutch K0 is placed in its engaged state, the engine output shaft 26 (crankshaft, for instance) which is an output member of the engine 12 is connected to the rotor 30 of the electric motor MG so that the engine output shaft 26 and the rotor 30 are rotated together. When the clutch K0 is placed in its released state, the engine output shaft 26 is disconnected from the rotor 30 of the electric motor MG. The clutch K0 is placed in the fully engaged state in the engine drive mode, and is placed in the released state in the motor drive mode. The rotor 30 of the electric motor MG is connected to a pump impeller 16*p* which is an input member of the torque converter 16, so that the rotor 30 and the pump impeller 16*p* are rotated together. The clutch K0 generates heat due to friction between its input-side friction plates and its output-side friction plates, so that an overheat upper limit temperature Tcmax of the clutch K0 is set to maintain its durability.

During operation of the hybrid vehicle, the clutch K0 is placed in a slipping state, when the vehicle drive mode is switched from electric-motor-driven running to engine-driven running, to prevent a switching shock due to an increase of the engine speed, so that a temperature Tc of the clutch K0 is raised due to the friction heat. If the clutch K0 is switched from its released state to its engaged state before the temperature Tc of the clutch K0 has been sufficiently lowered or when the temperature Tc remains close to the overheat upper limit Tcmax, the temperature Tc is raised beyond the overheat upper limit Tcmax due to the frictional heat generated by slipping during switching from the released state to the engaged state, giving rise to a risk of deterioration of the durability of the clutch K0.

The automatic transmission 18 cooperates with the torque converter 16 to constitute a part of the power transmitting path from the clutch KO to the drive wheels 24. For example, the automatic transmission 18 may be a step-variable automatic transmission having a plurality of coupling elements that are selectively engaged to perform step-variable shifting actions on the basis of an operating speed V of the vehicle and an accelerator angle Acc or a throttle valve opening angle θth and according to a stored relationship (shifting map). The automatic transmission 18 is constituted by a plurality of planetary gear sets, and a plurality of clutches and brakes actuated by the pressurized oil supplied from the hydraulic control circuit 34, for instance.

The torque converter 16 is a fluid-type power transmitting device disposed between the electric motor MG and the automatic transmission 18. The torque converter 16 is provided with: a pump impeller 16*p* which is an input-side rotary element that receives the drive force from the engine 12 and the electric motor MG; a turbine impeller 16*t* which is an output-side rotary element from which the drive force is transmitted to the automatic transmission 18; a stator impeller 16*s*; and the lock-up clutch LU for selectively connecting the pump impeller 16*p* and the turbine impeller 16*t* directly to each other. The stator impeller 16*s* is connected to a stationary member in the form of a housing 36 through a one-way clutch. The lock-up clutch LU is controlled by the pressurized oil supplied from the hydraulic control circuit 34.

The housing 36 connects the engine 12 and the automatic transmission 18 and accommodates the torque converter 16 and the electric motor MG. The pump impeller 16*p* of the torque converter 16 is provided with a gear-type hydraulic pump 38 so that the hydraulic pump 38 is operated by the engine 12. The hydraulic pump 38 functions as a hydraulic source of the hydraulic control circuit 34, and is operated to pressurize the oil returned to an oil pan (not shown), and to deliver the pressurized oil to the hydraulic control circuit 34. A portion of the pressurized oil delivered from the hydraulic pump 38 is used by the hydraulic control circuit 34 to control the automatic transmission 18, and the other portion of the pressurized oil is supplied as a lubricant or coolant to the electric motor MG and the clutch K0.

The electronic control device 58 shown in FIG. 1 functions as a control apparatus for controlling the drive system 10 and includes a so-called microcomputer. The electronic control device 58 receives various input signals from various sensors provided on the hybrid vehicle 8. For instance, the electronic control device 58 receives: an output signal of an accelerator angle sensor 60 indicative of the accelerator angle Acc representative of an amount of operation of an accelerator pedal 71; an output signal of an electric motor speed sensor 62 indicative of an operating speed Nmg of the electric motor MG (electric motor speed Nmg); an output signal of an engine speed sensor 64 indicative of an operating speed Ne of the engine 12 (engine speed Ne); an output signal of a turbine speed sensor 66 indicative of a rotating speed Nt of the turbine impeller 16t of the torque converter 16 (turbine speed Nt); an output signal of a vehicle speed sensor 68 indicative of the vehicle operating speed V; an output signal of a throttle valve opening angle sensor 70 indicative of the throttle valve opening angle θth(%) of the engine 12; and an output signal of an oil temperature sensor 72 indicative of a temperature Toil of the working oil in the hydraulic control circuit 34. It is noted that a difference between the engine speed Ne and the electric motor speed Nmg corresponds to a slipping speed of the clutch K0.

The electronic control device 58 has functional portions in the form of an EV-running switching command determining portion 78 configured to determine whether a drive-mode switching command for switching from engine-driven running (EHV running) to electric-motor-driven running (EV running) has been generated or not; a clutch temperature calculating portion 80 configured to estimate by calculation the estimated temperature Tc of the clutch K0 on the basis of actual parameters influencing the estimated temperature Tc, and according to a stored map or calculating equation; an EV-running permission determining portion 82 configured to determine, on the basis of the estimated temperature Tc, whether the switching from engine-driven running to electric-motor-driven running should be permitted or not; and an EV-running switching control portion 84 configured to switch the vehicle drive mode from engine-driven running to electric-motor-driven running when the EV-running permission determining portion 82 has determined that switching from engine-driven running to electric-motor-driven running should be permitted.

For instance, the drive-mode switching command which is determined by the EV-running switching command determining portion 78 is generated when an operating point of the vehicle defined by the accelerator angle Acc and the vehicle operating speed V has been moved into a low-load or low-speed region in a stored region determining map (relationship), which low-load or low-speed region is a predetermined electric-motor-driven running region, that is, generated when an operator's required drive force is reduced to within a predetermined small drive-force region. The drive-mode switching command is also generated when an electric energy amount SOC stored in the electric energy storage device 57 has exceeded a predetermined upper limit. For example, the clutch temperature calculating portion 80 is configured to repeatedly calculate the estimated temperature Tc of the clutch K0 upon the next engaging action, with a predetermined calculation cycle time of about several hundreds to several thousands of milliseconds, for instance, on the basis of the actual electric motor speed Nmg(rpm), engine speed Ne(rpm), transmitting torque TR(Nm) of the clutch K0, and working oil temperature Toil(° C.), and according to the following equations (1), (2) and (3) stored in memory in the form of functional equations or maps. In the equation (1), $Tc^{-1}$ represents the estimated temperature of the clutch K0 calculated in the last calculation cycle (which temperature is initially equal to the ambient temperature), ΔTu represents an amount of increase of the estimated temperature of the clutch K0 with respect to that calculated in the last calculation cycle, and ΔTd represents an amount of decrease of the estimated temperature of the clutch K0 with respect to that calculated in the last calculation cycle time. In the equation (2), TQ represents the transmitting torque of the clutch K0 (which is equal to the cranking torque upon starting of the engine 12, for example), and Cc represents a thermal capacity (cal/° C.) of the clutch K0. In the equation (3), λ represents the thermal conductivity of the clutch K0, and S represents a surface area of the clutch K0. The transmitting torque TQ of the clutch K0 used in the equation (2), which is a torque upon starting of the engine, may be a fixed value and can be calculated on the basis of the commanded hydraulic pressure value of the clutch K0, and according to a predetermined experimental equation. In the equation (2), f((Nmg−Ne), TQ) is the predetermined experimental equation for calculating the amount (cal) of heat generation as a function of a slipping speed (Nmg−Ne) of the clutch K0, and the transmitting torque TQ of the clutch K0 corresponding to the pressing force acting thereon. It is noted that the engine speed Ne upon starting of the engine 12 is in a range between 0 rpm and several hundreds of rpm.

$$Tc = Tc^{-1} + \Delta Tu + \Delta Td \quad (1)$$

wherein, $$\Delta Tu = f((Nmg-Ne), TQ)/Cc \quad (2)$$

$$\Delta Td = \lambda \times S \times (Tc^{-1} - Toil) \quad (3)$$

In equations (2) and (3), Cc, α and S are constants, while Nmg, Ne, TQ and Toil are variables, so that the estimated temperature Tc of the clutch K0 is stored in memory as a function F obtained from equation (1) and represented by equation (4) below, in the form of a functional equation or data map. Those variables Nmg, Ne, TQ and Toil are actual parameters influencing the temperature Tc of the clutch K0, and are repeatedly obtained with the predetermined calculation cycle time, as average values during a period between the last and present calculation cycles.

$$Tc = F(Nmg, Ne, TQ, Toil) \quad (4)$$

The EV-running permission determining portion 82 is configured to compare the estimated temperature Tc of the clutch K0 calculated by the clutch temperature calculating portion 80, with the predetermined overheat threshold value α, to determine that switching from engine-driven running (EHV running) to electric-motor-driven running (EV running) should be permitted, if the estimated temperature Tc of the clutch K0 is lower than the overheat threshold value α, and to determine that switching from engine-driven running (EHV running) to electric-motor-driven running (EV running) should be inhibited, if the estimated temperature Tc of the clutch K0 is not lower than the overheat threshold value α. As a result of this inhibition, engine-driven running is continued, and switching to electric-motor-driven running and switching from electric-motor-driven running to engine-driven running by the engaging action of the clutch K0 are inhibited. The overheat threshold value α is determined on the basis of the overheat upper limit temperature Tcmax of the clutch K0, which is determined by the specific design of the clutch K0. For instance, the overheat threshold value α is determined to be the overheat upper limit temperature Tcmax, or a value (Tcmax−Tc) which is lower than the overheat upper limit temperature Tcmax by a predetermined margin value ΔTc. This margin value ΔTc is preliminarily obtained by experimentation, while taking account of temperature increase characteristics of the clutch K0 and a response delay of the temperature estimating system.

The EV-running switching control portion 84 is configured to switch the vehicle drive mode from engine-driven running to electric-motor-driven running according to the determination by the EV-running switching command determining portion 78, if the EV-running permission determining portion 82 has determined that switching from engine-driven running (EHV running) to electric-motor-driven running (EV running) should be permitted, but to continue engine-driven running, if the EV-running permission determining portion 82 has determined that switching from engine-driven running (EHV running) to electric-motor-driven running (EV running) should be inhibited.

Figure 2:
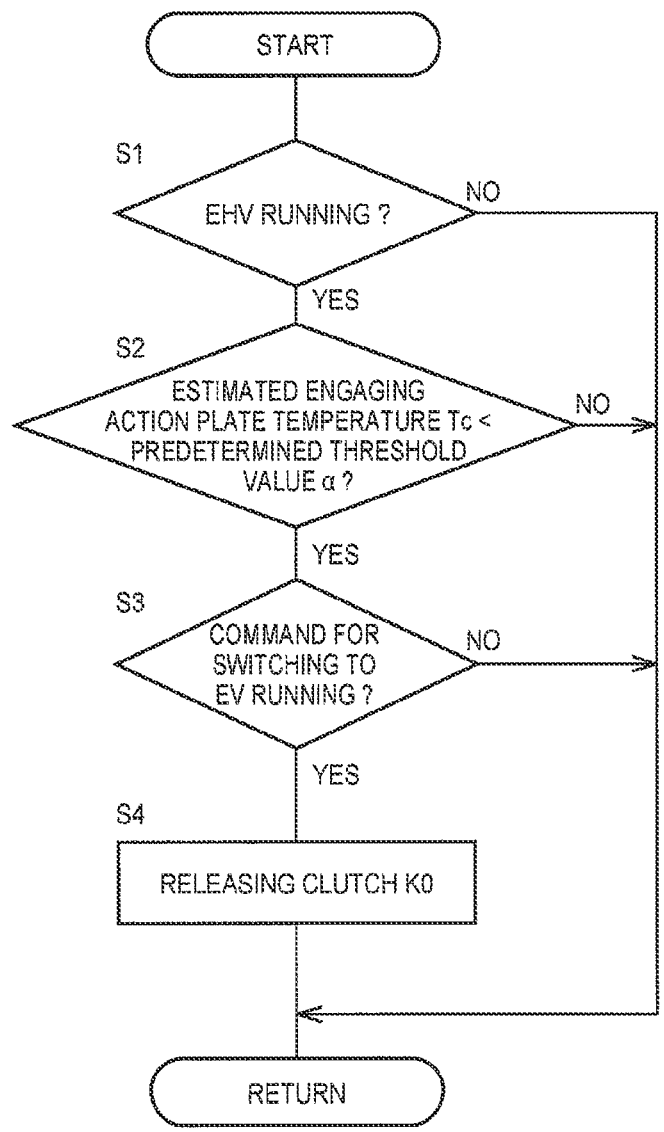
FIG. 2 is a flow chart of major control operations of the electronic control device of FIG. 1.

FIG. 2 is the flow chart for explaining the major control operations of the electronic control device 58, namely, major control operations to prevent the temperature of the clutch K0 from exceeding the overheat upper limit Tcmax due to the slipping action of the clutch K0 during switching from engine-driven running to electric-motor-driven running. In FIG. 2, step S1 (the term "step" being hereinafter omitted) is implemented to determine whether the vehicle is in engine-driven running (EHV running). For instance, this determination is made on the basis of a control flag indicating whether or not the engine drive mode is established. If a negative determination is obtained in S1, the present control routine is terminated, and engine-driven running is continued. If an affirmative determination is obtained in S1, on the other hand, the control flow goes to S2 corresponding to the clutch temperature calculating portion 80 and the EV-running switching permission determining portion 82.

In S2, the estimated temperature Tc of the clutch K0 is initially calculated on the basis of actual values of the variables in the form of the electric motor speed Nmg, engine speed Ne, transmitting torque TQ of the clutch KO and the temperature Toil of the working oil used to lubricate the clutch K0, and according to the relationship represented by the stored equation (4). Then, the determination as to whether the calculated estimated temperature Tc of the clutch K0 is lower than the predetermined overheat threshold value α (Tc<α) is made. If a negative determination is obtained in S2, the present control routine is terminated, so that switching to electric-motor-driven running by the releasing action of the clutch K0 is inhibited, and engine-driven running is continued with the clutch K0 kept in the fully engaged state. It will be understood that the EV-running permission determining portion 82 corresponds to a switching control portion configured to continue engine-driven running while inhibiting the releasing action of the clutch KO if the estimated temperature Tc of the clutch K0 calculated by the clutch temperature calculating portion 80 is not lower than the predetermined overheat threshold value α. If an affirmative determination is obtained in S2, on the other hand, the control flow goes to S3 corresponding to the EV-running switching command determining portion 78.

In S3, the determination as to whether the command for switching to electric-motor-driven running has been generated or not is made on the basis of a control flag indicating whether the command is present or not, for instance. This control flag is set into an on state when the operator's required vehicle drive force calculated on the basis of the amount of the operator's operation of the accelerator pedal during engine-driven running is reduced below the lower limit, or when the electric energy amount SOC stored in the electric energy storage device 57 charged during engine-driven running has exceeded the upper limit. If a negative determination is obtained in S3, the present control routine is terminated, and engine-driven running is continued. If an affirmative determination is obtained in S3, on the other hand, the control flow goes to S4 corresponding to the EV-running switching control portion 84.

S4 is implemented to release the clutch K0 for switching the vehicle drive mode from engine-driven running to electric-motor-driven running, after the determination in S2 that the estimated temperature Tc of the clutch K0 calculated based on the actual values is lower than the predetermined overheat threshold value α (Tc<α), and after the determination in S3 that the command for switching to electric-motor-driven running has been generated. The control routine is terminated with S4. At the same time, the operating speed Ne of the engine 12 is lowered to stop the engine 12, under the control of the engine output control device 14.

Figure 3:
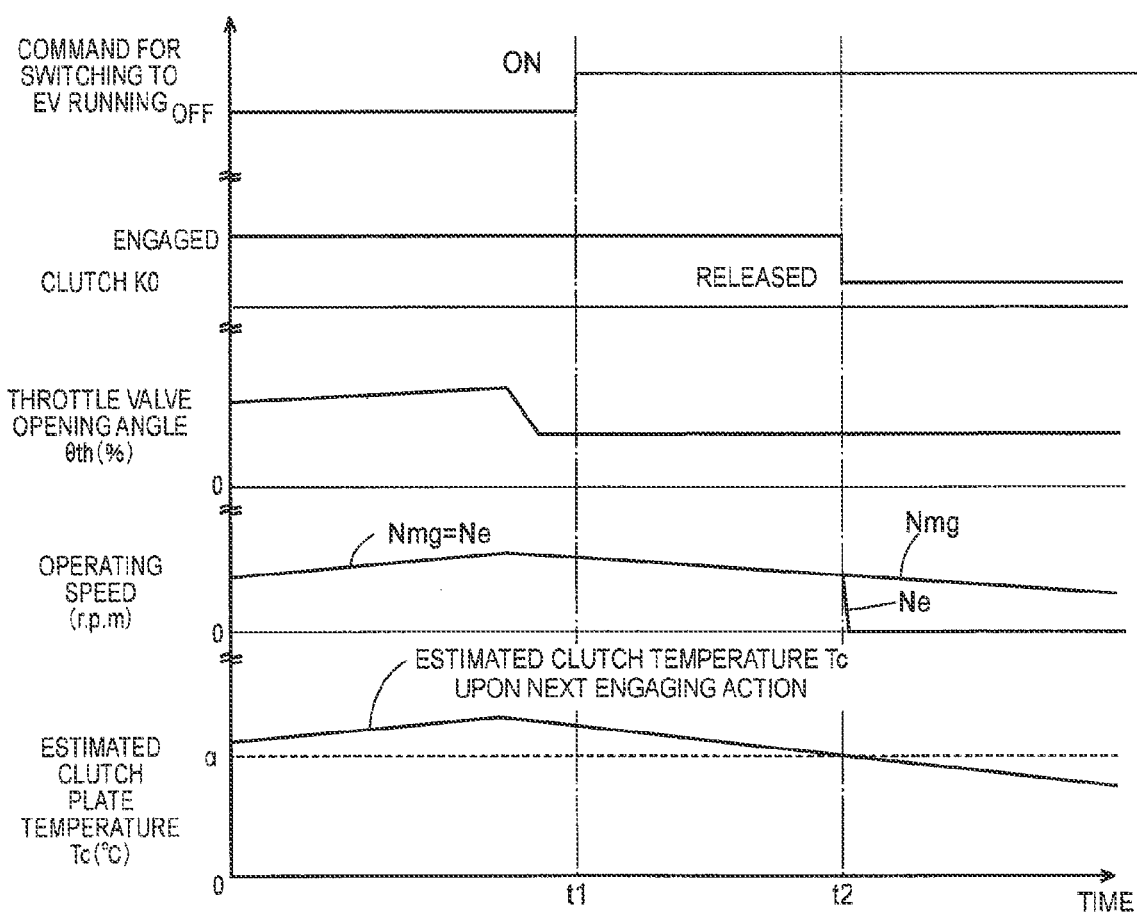
FIG. 3 is a time chart graphically depicting the major control operations of the electronic control device of FIG. 1.

FIG. 3 is a time chart graphically depicting the major control operations of the electronic control device 58. When the operator's required drive force is reduced as a result of a decrease of the throttle valve opening angle θth during engine-driven running, the command for switching to electric-motor-driven running is generated at a point of time t1, as indicated in FIG. 3. At this point of time t1, the estimated temperature Tc of the clutch K0 calculated from time to time is not lower than the overheat threshold value α, so that the negative determination is obtained in S2 indicated in FIG. 2, whereby the releasing action of the clutch K0 for switching to electric-motor-driven running is inhibited. Thus, the clutch K0 is kept in its fully engaged state, and heat generation by the clutch K0 is restricted, so that the estimated temperature Tc is gradually lowered for a time period between the points of time t1 and t2. When the estimated temperature Tc of the clutch K0 calculated from time to time is lowered below the overheat threshold value α, the affirmative determinations are obtained in S2 and S3 of FIG. 2, so that the clutch KO is brought into its released state in S4, and the operating speed Ne of the engine 12 is reduced to stop the engine 12, whereby the vehicle drive mode is switched from engine-driven running to electric-motor-driven running, at a point of time t2 indicated in FIG. 3.

The embodiment of the control apparatus described above is configured to continue engine-driven running by inhibiting the releasing action of the clutch K0 for switching from the present engine-driven running to electric-motor-driven running, if the estimated temperature Tc of the clutch KO is not lower than the overheat threshold value α, and to permit switching from electric-motor-driven running back to engine-driven running if the estimated temperature Tc of the clutch K0 is lower than the overheat threshold value α. Accordingly, it is possible to maintain a high degree of drivability of the vehicle, by preventing overheating of the clutch K0 due to the temperature increase caused by the slipping action of the clutch K0 upon releasing the clutch KO to switch from engine-driven running to electric-motor-driven running and thereby reducing deterioration of the durability of the clutch K0 due to the overheating.

The present embodiment of the control apparatus is further configured such that the clutch K0 is constituted by a wet-type multiple-disc friction clutch having a plurality of friction plates, that is input-side clutch plates and output-side clutch plates, which are lubricated by a lubricant, and such that the estimated temperature Tc of the clutch K0 is calculated on the basis of the slipping speed (=electric motor speed Nmg−engine speed Ne) of the clutch K0, the engaging torque of the clutch K0 (cranking torque or transmitting torque TQ of the clutch K0), and the temperature Toil of the working oil for lubricating the clutch K0. Accordingly, it is not necessary to use a dedicated temperature sensor for detecting the estimated temperature of a component of the clutch K0, so that the required number of parts of the control apparatus can be reduced. In addition, the estimated temperature Tc of the clutch K0 is calculated on the basis of a difference between the electric motor speed Nmg and the engine speed Ne, which difference causes heat generation due to the friction of the clutch K0, and on the basis of the transmitting torque TQ of the clutch K0. Accordingly, the delay in temperature detection can be advantageously shortened as compared with that in the case of direct detection of the temperature by using an dedicated temperature sensor.

While the embodiment of the control apparatus has been described in detail by reference to the drawings, it is to be understood that the control apparatus may be otherwise embodied.

In the illustrated embodiment, the releasing action of the clutch K0 is not permitted to be performed or is inhibited so that the clutch K0 is kept in its fully engaged state, if a negative determination is obtained in S2 corresponding to the EV-running permission determining portion 82. However, the clutch K0 need not be kept in its fully engaged state in that case, and may be placed in a slightly slipping state, as long as the engaging action of the clutch K0 is restricted so that the clutch K0 is kept in a substantially engaged state.

Further, S1, S2 and S3 in the flow chart of FIG. 2 may be implemented in any order other than that in the illustrated embodiment.

While the clutch K0 is the wet-type multiple-disc clutch in the illustrated embodiment, the clutch K0 may be a dry-type single-disc clutch, a magnetic powder clutch, an electromagnetic clutch or any other type of clutch.

In the illustrated embodiment, the estimated temperature Tc of the clutch K0 upon the next engaging action is calculated on the basis of the actual electric motor speed Nmg, engine speed Ne, transmitting torque TQ of the clutch K0 and temperature Toil of the working oil for lubricating the clutch K0, and according to the predetermined relationship (4) stored in memory. For simplifying the estimation, the temperature Toil of the working oil for lubricating the clutch K0 may be treated as a constant parameter, since the temperature Toil varies over a relatively small range. Further, the estimated temperature Tc of the clutch K0 may be obtained by dedicated temperature sensor for detecting the temperature of the clutch K0.

While the automatic transmission 18 is a step-variable transmission in the illustrated embodiment, the automatic transmission 18 may be replaced by a continuously-variable transmission (CVT) the speed ratio of which is continuously variable. Further, the automatic transmission 18 need not be provided.

In the illustrated embodiment, the engine 12 and the electric motor MG are disposed coaxially with each other, as shown in FIG. 1. However, the electric motor MG may be disposed on an axis spaced from an axis of the engine 12, and operatively connected to the engine connecting/disconnecting clutch K0 and the torque converter 16 through a transmission or a chain.

Although the torque converter 16 in the illustrated embodiment is provided with the lock-up clutch LU, the torque converter 16 need not be provided with the lock-up clutch LU. Further, the vehicle drive system may not be provided with the torque converter 16.

In the illustrated embodiment, the torque converter 16 is provided as a fluid-type power transmitting device. However, the torque converter 16 may be replaced by a fluid coupling device not having a torque amplifying function or the like.

It is to be understood that the foregoing embodiment and modifications have described for illustrative purpose only, and that the systems and control apparatuses described herein may be embodied with various other changes and improvements without departing from the spirit and scope of the subject matter described herein.

NOMENCLATURE OF REFERENCE SIGNS

10: Vehicular drive system
12: Engine
24: Drive wheels
58: Electronic control device (Control apparatus)
MG: Electric motor
K0: Clutch
Tc: Clutch temperature

The invention claimed is:

1. A control apparatus for a hybrid vehicle which is provided with an engine and an electric motor each functioning as a drive power source, and a clutch selectively connecting the engine and the electric motor to each other, said control apparatus being configured to switch a drive mode of the hybrid vehicle between an engine-driven running with at least said engine of the drive power source consisting of the engine and said electric motor used as the drive power source and with said clutch placed in a fully engaged state, and an electric-motor-driven running with said electric motor used as the drive power source and with said clutch placed in a released state, comprising:
   a clutch temperature calculating portion configured to calculate, during said engine-driven running, an estimated temperature of said clutch upon a next engaging action of the clutch for switching of said drive mode from the following electric-motor-driven running back to the engine-driven running; and
   a switching control portion configured to continue the engine-driven running while inhibiting a releasing action of said clutch if said estimated temperature of the clutch calculated by said clutch temperature calculating portion is not lower than a predetermined overheat threshold value.

2. The control apparatus according to claim 1, wherein said clutch is a wet-type multiple-disc friction clutch having friction plates lubricated by a lubricant, and the estimated temperature of said clutch is calculated on the basis of a slipping speed of said clutch, an engaging torque of said clutch, and a temperature of said lubricant for lubricating the clutch.

* * * * *